Patented Apr. 6, 1926.

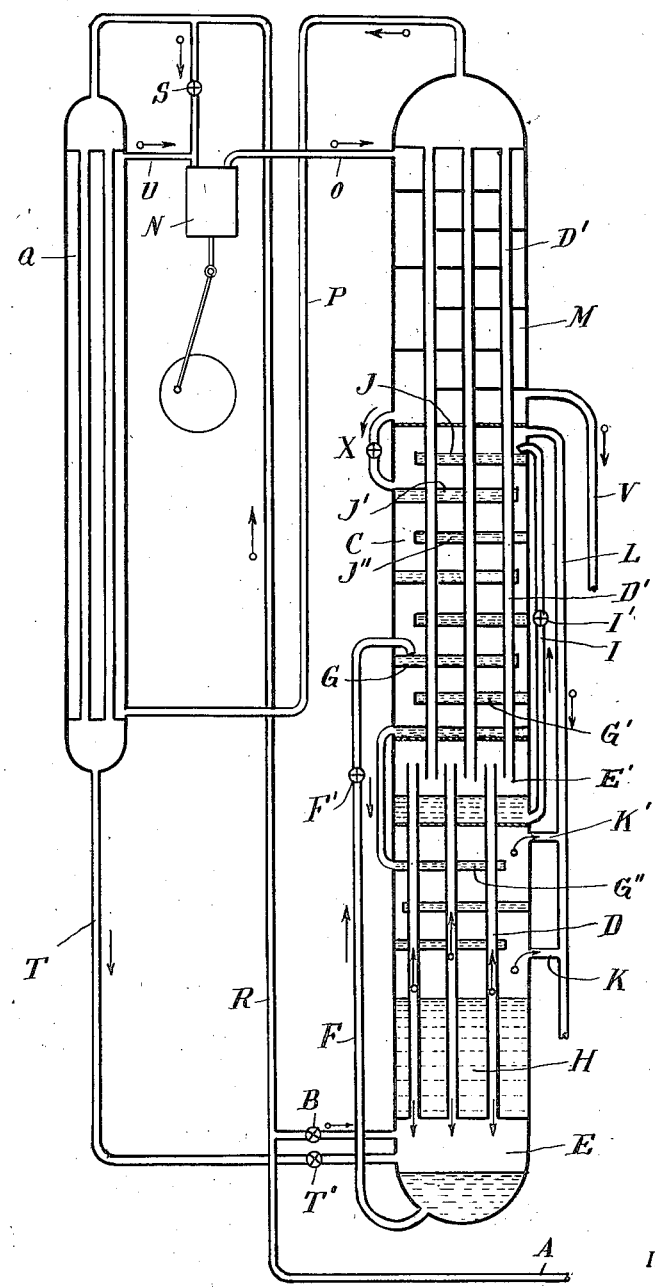

1,579,348

UNITED STATES PATENT OFFICE.

GEORGES CLAUDE, OF PARIS, FRANCE, ASSIGNOR, BY MESNE ASSIGNMENTS, TO LAZOTE INC., A CORPORATION OF DELAWARE.

MANUFACTURE OF HYDROGEN BY THE PARTIAL LIQUEFACTION OF GASEOUS MIXTURES.

Application filed January 7, 1922. Serial No. 527,542.

*To all whom it may concern:*

Be it known that I, GEORGES CLAUDE, a citizen of the Republic of France, residing at Paris, in the Republic of France, have invented certain new and useful Improvements in the Manufacture of Hydrogen by the Partial Liquefaction of Gaseous Mixtures; and I do hereby declare the following to be a full, clear, and exact description of the invention, such as will enable others skilled in the art to which it appertains to make and use the same.

This invention relates to the manufacture of hydrogen by the partial liquefaction of gaseous mixtures containing the same, such as coke-oven gases or the like and also water-gas.

In United States Letters Patent No. 1,212,455, a process and apparatus is described with reference particularly to the extraction of hydrogen from a mixture of two gases of very different volatility, such for example as hydrogen and carbon-monoxide in water-gas. The present invention deals with the more complex case involved in the treatment of ordinary coal-gas, coke-oven or other similar gases, after the conversion of such mixture of gases by a preliminary purifying treatment into a mixture consisting simply of hydrogen, nitrogen, carbon-monoxide and methane. The process according to the present invention is founded essentially on the discovery that the three last mentioned gases of this mixture, i. e., methane, carbon-monoxide and nitrogen, are, to a large extent, miscible with one another when in the liquid state. When proper advantage be taken of this fact the serious difficulties which the freezing of the methane would cause can be overcome. The process avoids also the difficulties occasioned by freezing of the carbon-monoxide in case it is desired to obtain hydrogen wholly free from this gas, as is particularly important in the synthesis of ammonia.

According to this invention, the process for the manufacture of hydrogen depends upon the partial liquefaction of mixtures of gases of which the main constituents are hydrogen, nitrogen, carbon-monoxide and methane, such as the mixtures of gases comprising the aforesaid constituents obtained from coke-oven or like gases after subjecting them to a preliminary purification treatment. It consists in subjecting the gaseous mixture to be treated, under the desired conditions of compression and low temperature, to temperatures which decrease progressively from the temperature at which methane boils to a temperature about that at which nitrogen freezes under atmospheric pressure, the conditions of operation of the process being such that the liquid produced flows back in the reverse direction to the flow of the gaseous mixture treated whereby the said liquid encounters higher and higher temperatures during its backward travel.

For the purpose of the present invention, therefore, the case may be considered of an ascending stream of the mixture of gases, previously cooled to substantially its dew point by circulation in counter-current with the separated gases, and subjected during its ascent either in the tubes of a tubular system or through the plates of a rectification column to a temperature which decreases regularly from that of the boiling point of pure liquid methane to substantially that of solidification of the most refractory of the three gases above mentioned, namely the nitrogen. Under these conditions the methane, the carbon-monoxide and the nitrogen will condense successively into liquid mixtures flowing in a reverse direction to that of the ascending stream of gases and containing successively less and less methane and more and more carbon-monoxide, and finally nitrogen. The successive liquid mixtures are, therefore, more and more difficult to congeal.

Under the conditions mentioned, each of the gases will be washed and rectified by the succeeding one and will be thus prevented from reaching a zone where it might freeze and stop the working of the apparatus. Finally there will remain gaseous hydrogen contaminated only by the very small quantity of nitrogen which is capable of existing in a gaseous state at such a low temperature.

Since there is a very great difference between the extreme boiling and freezing points of these liquids, (—210.5° C. and —195.5° C. for nitrogen and —184° C. and —164° C. for methane), the best results are obtained by collecting and utilizing separately in two or three fractions the liquids successively formed during the upward passage of the gases instead of collecting the liquid which flows back in a single portion. Provision is accordingly made for the collection and utilization of several fractions.

Two different considerations, both arising from the fact that a mixture of gases has to be dealt with, the liquids corresponding to which present great differences of volatility, lead to the necessity for dividing the tubular liquefaction system into two or more systems separated by one or two collectors. Thus if, on the one hand, there were only a single tubular system, the liquid nitrogen, flowing back from the higher parts and reaching that part of the apparatus containing boiling methane, where the temperature is, comparatively speaking, very high, would revaporize energetically, and this would obstruct the proper internal working of the apparatus. On the other hand, the single liquid collected under these conditions, (the miscible mixture of nitrogen, carbon-monoxide and methane), would have a temperature much higher than —195° C., which temperature the liquid nitrogen alone permits of being obtained, and consequently it would be impossible to obtain along the exterior of the tubular system of the fractionating column the gradation of temperature hereinbefore referred to.

By carrying out the process so as to avoid these drawbacks in the manner stated above, there will finally remain gaseous hydrogen, and this hydrogen, which is still in the compressed condition, will furnish, by expanding it with the production of external work, the cold necessary for carrying out the process. As is known, however, in order to ensure by this expansion the production of the greatest amount of cold possible, it is necessary to reheat the compressed hydrogen prior to its expansion to the greatest possible extent and this reheating may be effected according to known methods. In the case of the present invention, the reheating of the compressed hydrogen may also be effected by causing it to circulate in a liquefier fed by a portion of the compressed cold gas which is delivered to the separating apparatus. In this method of circulation, the hydrogen, because of its cold condition, effects the partial liquefaction of this part of the gas treated, and, consequently, its own temperature is raised. The liquid formed by this liquefaction is sent to the main separating apparatus where the gaseous mixture is treated. The compressed hydrogen is expanded only after this reheating and the expanded hydrogen, which is then very cold, passes on to the separating apparatus in order to produce there, by its very low temperature, the final separation of the gases treated.

In order that the invention may be clearly understood and readily carried into effect, it will now be described more fully with reference to the accompanying drawing which shows diagrammatically, by way of example, an apparatus suitable for carrying out the present process. In the drawing the well known exchangers of temperatures in which the compressed gaseous mixture to be treated is cooled by the cold gases issuing from the separating apparatus are not shown.

The cold compressed mixture, after a previous purification as mentioned above, and consisting, therefore, of hydrogen, nitrogen, carbon-monoxide and methane, is admitted through the pipe A, and the greater part passing through the regulating valve B enters the separating apparatus proper. This apparatus comprises a column C containing, for example, two nests of tubes D, $D^1$ placed one above the other and provided with collectors E, $E^1$.

The gases entering through the valve B first ascend through the tubes of the nest D, and then, after passing through the second collector $E^1$, ascend through the tubes of the nest $D^1$. During their ascent the gases, as will be hereinafter explained, are subjected to lower and lower temperatures and finally at the top of the tubes $D^1$ they attain a temperature approximating that at which nitrogen saturated with hydrogen freezes. Under these conditions, the liquefaction of the methane, the carbon-monoxide and the nitrogen is successively effected in the manner explained above, and the liquids flow back towards the bottom of the apparatus in proportion to the respective amounts produced and are received in the collectors E and $E^1$.

In E liquid methane together with a little carbon-monoxide is collected. By means of the pipe F, which is provided with a pressure-reducing valve F', this liquid is delivered into the column C in which the pressure is about atmospheric, at a point about the middle of the column, and it descends over the successive plates G, G', G'', etc., and evaporates, owing to the internal liquefaction, losing at first the carbon-monoxide which it contains and thus producing, around the nest of tubes D, a temperature gradient. In H at the bottom of the column nearly pure methane vaporizes and can be collected.

In $E^1$ a mixture consisting essentially of carbon-monoxide and nitrogen is collected; this liquid, which is much colder than the preceding one, is delivered by the pipe I which is provided with a pressure-reducing valve I', over the upper plates J, J', J'' etc., of the column C. It descends from plate to plate, losing at first mostly nitrogen, then carbon-monoxide and producing around the nest of tubes $D^1$ a temperature gradient. On the plates G it meets the liquid coming from the collector E.

The gases which are evaporated in the column C pass off through the pipes K, K¹ and L and can be collected as a mixture of nitrogen, carbon-monoxide and methane in one of the internal compartments of an exchanger to be brought back subsequently to the surrounding temperature and thereafter utilized. If desired, the methane may also be delivered from the pipe K into a separate compartment of the exchanger in order to collect it separately.

Beyond the upper evaporation compartment of the column C containing the plates J, the nest of tubes D¹ extends into another compartment M of this column, in which the gases are subjected, still under their original pressure, to the action of a temperature obtained as will be hereinafter described and which is still lower than that of nitrogen boiling under atmospheric pressure, so as to complete the elimination of the carbon-monoxide by the washing to which it is subjected by the last portions of nitrogen. With this object in view, the residual gases consisting of practically pure hydrogen arriving at the top of the tubes D¹, may be sent to expand (with the production of external work) as completely and efficaciously as possible, for example, in compound engine or expander N, if necessary without any intermediate heating. The residual gases are thus reduced to a very low temperature and are sent into the compartment M to circulate around the tubes of the nest D¹. However, as has been mentioned above, this expansion is only entirely satisfactory, if not as regards the final temperature, at least as regards the quantity of cold produced, if the gases to be expanded are first subjected to a suitable reheating. For this purpose, for example, they are, in accordance with this invention, first passed through the pipe P around the tubes of the liquefier Q into which a portion of the gases to be treated are delivered through the pipe R. The reheating is carried to the point which insures the production of the greatest amount of refrigeration while maintaining at the same time the low temperature required for the purification of the gas, through the upper portions of the tubes of the bundle D'. The temperature may be the same or higher or lower than the temperature attained when there is no reheating. The quantity of refrigeration is greater, however, when the gas is re-heated. During the operations so far described the valve S is closed. The liquid formed in this liquefier Q is discharged, together with the non-liquefied hydrogen, through the pipe T provided with a valve T' into the collector E. In order, however, to ensure that this circulation is sufficient, it is necessary, by means of a suitable regulation of the valve B, to cause a suitable quantity of the gas to be treated to follow the course through R, Q, T, instead of following the course through B.

In order to increase the efficiency of the expansion in respect to the amount of cooling obtained, not only the hydrogen but also the nitrogen and the carbon-monoxide may be caused, on leaving the column, to pass through suitable liquefiers which are also fed by a portion of the gas to be treated.

It has been mentioned that under the conditions realized with the present invention an excellent elimination of the carbon-monoxide is effected by reason of the final washing of the ascending gases by a sufficient quantity of liquid nitrogen saturated with hydrogen, the temperature of freezing of which liquid is considerably lower than that of carbon-monoxide. It is possible to benefit by these advantages in the least favorable case, namely that of water-gas, which generally contains only a very small proportion of nitrogen, by treating the water-gas in an apparatus such as that described above, after having added to it a suitable proportion of nitrogen or gases of combustion. If the proportion of hydrogen should then become insufficient to furnish by its expansion the desired temperature or quantity of cold necessary, it would suffice to add also to the gas treated a suitable proportion of the hydrogen produced in the operation of the process, which would amount to making the same quantity of hydrogen circulate indefinitely in the cycle.

It is to be understood that while the invention has been particularly described in its detailed application to the production of hydrogen, its utilization is not necessarily so limited. It is my intention, therefore, to claim the "invention" in all of its applications. Obviously many changes may be made in the details of the invention within the scope of the accompanying claims without departing from the essential features as hereinbefore set forth.

I claim:

1. A process for the manufacture of hydrogen by partial liquefaction of mixtures of gases of which the main constituents are hydrogen, nitrogen, carbon-monoxide and methane, such as the mixtures of gases comprising the aforesaid constituents obtained from coke oven or like gases after subjecting them to a preliminary purification treatment, which process consists in subjecting the compressed and cold gaseous mixture to be treated to temperatures which decrease progressively from the temperature at which methane boils under about atmospheric pressure to a temperature about that at which nitrogen freezes under about atmospheric pressure, a gas containing substantially the whole of the hydrogen being collected and the liquids progressively formed being prevented from reaching regions where they might freeze by flowing back in the reverse direction to the flow of the gaseous mixture treated.

2. A process for the manufacture of hydrogen by partial liquefaction of mixtures of gases of which the main constituents are hydrogen, nitrogen, carbon monoxide and methane, such as the mixtures of gases comprising the aforesaid constituents obtained from coke oven or like gases after subjecting them to a preliminary purification treatment, which process consists in subjecting the compressed and cold gaseous mixture to be treated to temperatures which decrease progressively from the temperature at which methane boils under about atmospheric pressure to a temperature about that at which nitrogen freezes under about atmospheric pressure, a gas containing substantially the whole of the hydrogen being collected and the liquids progressively formed being prevented from reaching regions where they might freeze by flowing back in the reverse direction to the flow of the gaseous mixture treated, those liquids being collected in two or more successive portions separately from one another and being employed for obtaining by their vaporization the above mentioned gradation of temperatures.

3. A process for the manufacture of hydrogen by partial liquefaction of mixtures of gases of which the main constituents are hydrogen, nitrogen, carbon monoxide and methane, such as the mixtures of gases comprising the aforesaid constituents obtained from coke oven or like gases after subjecting them to a preliminary purification treatment, which process consists in subjecting the compressed and cold gaseous mixture to be treated to temperatures which decrease progressively from the temperature at which methane boils under about atmospheric pressure to a temperature about that at which nitrogen freezes under about atmospheric pressure and the liquids progressively formed being prevented from reaching regions where they might freeze by flowing back in the reverse direction to the flow of the gaseous mixture treated, a gas containing substantially the whole of the hydrogen being collected then heated by circulation in indirect contact with a portion of the compressed gaseous mixture treated whereby said gaseous mixture is cooled and partially liquefied, the partially heated hydrogen being then expanded with production of external work and the cold expanded hydrogen being utilized for the final purification by liquefaction of the gaseous mixture treated.

4. A process for the manufacture of hydrogen from water gas which comprises adding to the water gas a suitable proportion of nitrogen or of gases of combustion and subjecting the compressed and cold gaseous mixture thus obtained to progressively decreasing temperatures, a gas containing substantially the whole of the hydrogen being collected and the liquids progressively formed being prevented from reaching regions where they might freeze by flowing back in the reverse direction to the flow of the gaseous mixture treated.

5. A process for the separation of the constituents of gaseous mixtures such as those containing hydrogen, nitrogen, carbon monoxide and methane in city or coke oven gases, which comprises subjecting the mixture to selective liquefaction in successive stages, separately collecting the products at each stage, and evaporating the liquid thus collected by utilizing it in the selective liquefaction of further quantities of gaseous mixture, thereby maintaining a decreasing temperature gradient to which the gaseous mixture is subjected as it passes through the apparatus, and finally subjecting the gaseous mixture to indirect contact with the cold expanded unliquefied residue of the operation.

6. A process for the separation of the constituents of gaseous mixtures such as those containing hydrogen, nitrogen, carbon monoxide and methane in city or coke oven gases, which comprises subjecting the mixture to selective liquefaction in successive stages, separately collecting the product at each stage, evaporating the liquid thus collected by utilizing it in the selective liquefaction of further quantities of gaseous mixture, thereby maintaining a decreasing temperature gradient to which the gaseous mixture is subjected as it passes through the apparatus, withdrawing the unliquefied gaseous residue of the operation, raising the temperature of this residue by indirect contact with part of the incoming gaseous mixture, expanding with external work the residue thus warmed and utilizing the cold expanded product to effect the final refrigeration of the gaseous mixture.

7. A process for the separation of the constituents of gaseous mixtures such as those containing hydrogen, which comprises subjecting the mixture to selective liquefaction in successive stages, separately collecting the product at each stage, evaporating the liquid thus collected by utilizing it in the selective liquefaction of further quantities of gaseous mixture, thereby maintaining a decreasing temperature gradient to which the gaseous mixture is subjected as it passes through the apparatus, withdrawing the unliquefied gaseous residue of the operation, raising the temperature of this residue by indirect contact with a portion of the incoming gaseous mixture, expanding with external work the residue thus warmed, utilizing the cold expanded product to effect the final refrigeration of the gaseous mixture and the partial liquefaction of a portion of the gaseous residue.

8. A process for the separation of the constituents of gaseous mixtures such as those containing hydrogen, which comprises subjecting the mixture to selective liquefaction in successive stages, separately collecting the product at each stage, evaporating the liquid thus collected by utilizing it in the selective liquefaction of further quantities of gaseous mixture, thereby maintaining a decreasing temperature gradient to which the gaseous mixture is subjected as it passes through the apparatus, withdrawing the unliquefied gaseous residue of the operation, raising the temperature of this residue by indirect contact with a portion of the incoming gaseous mixture, expanding with external work the residue thus warmed, utilizing the cold expanded product to effect the final refrigeration of the gaseous mixture and the partial liquefaction of a portion of the gaseous residue, and utilizing the cold evaporated products for the partial liquefaction of distinct portions of the gaseous mixture.

In testimony whereof I affix my signature.

GEORGES CLAUDE.